United States Patent Office 3,274,097
Patented Sept. 20, 1966

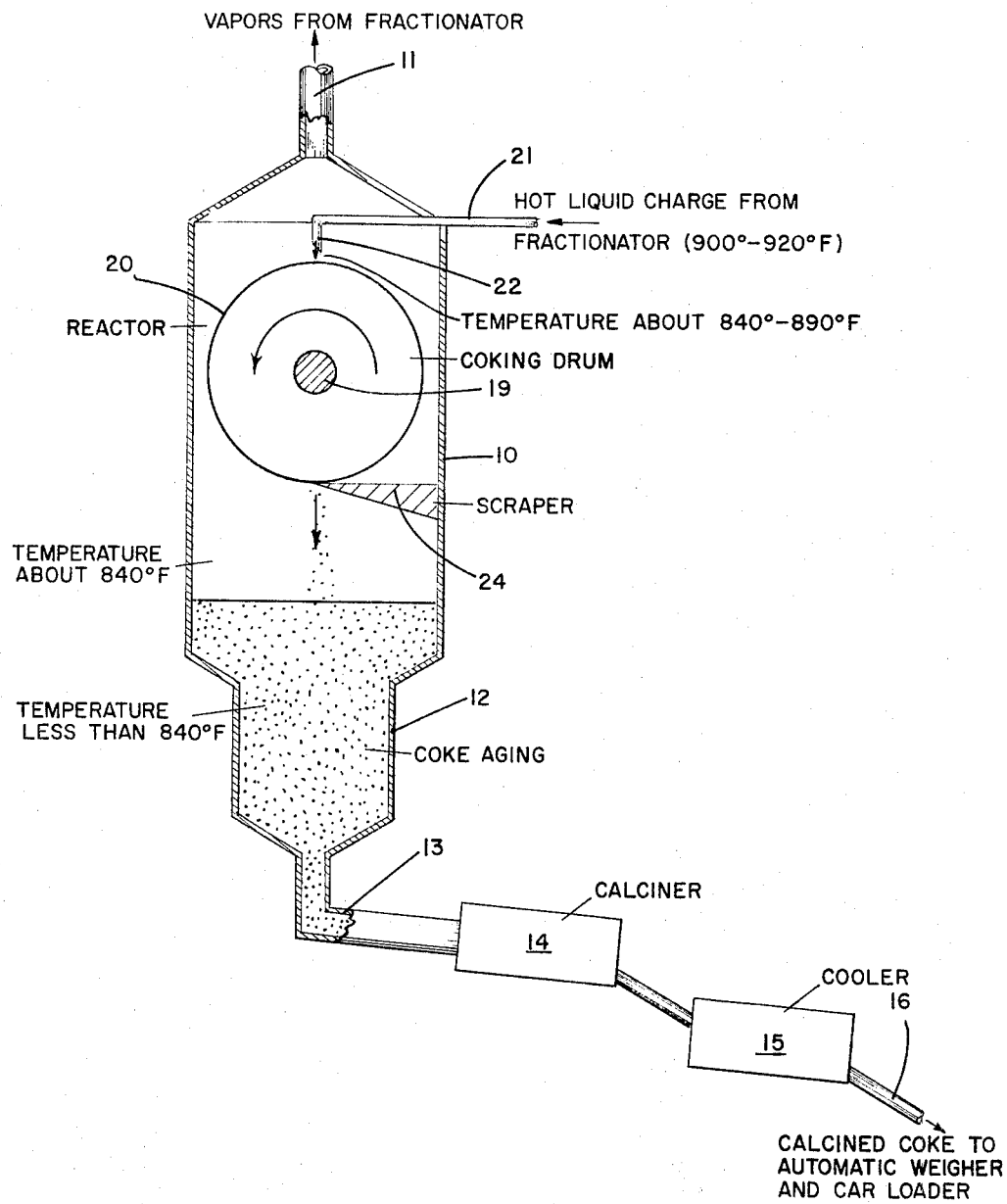

3,274,097
METHOD AND APPARATUS FOR CONTROLLING CARBON CRYSTALLIZATION
James A. Biehl, Robinson, Ill., assignor to Marathon Oil Company, a corporation of Ohio
Filed Oct. 4, 1965, Ser. No. 496,738
9 Claims. (Cl. 208—46)

This application is a continuation-in-part of my co-pending United States application Serial No. 151,747, filed November 13, 1961.

This invention relates to a method and apparatus for controlling carbon crystallization, and more particularly to a continuous process and apparatus for producing petroleum coke having a high graphite index of crystallinity.

Pure carbon exists in three forms, that is, amorphous, graphite and diamond. These three forms differ only in atomic arrangement. The amorphous form does not possess definite crystallinity, whereas graphite and diamond carbons are highly crystalline. The difference between graphite and diamond resides in the orientation of the carbon bondage in the crystal. In graphite, the bondage within the crystal layers is a resonating force which yields strong electronic conductivity. This characteristic is necessary for strong conductors of electrical energy and is highly desirable and necessary in electrode production.

Amorphous and diamond carbons do not possess this characteristic and crystal bondage is such as to retard electronic conductivity. The crystal structure of graphite has a repeating hexagonal characteristic in which perfectly flat planes of carbon atoms lie at the corners of contiguous hexagons and are stacked in registry to form three dimensional crystals called "statostratic" wherein the carbon atoms in each flat layer are spaced 1.42 angstroms apart with the layers spaced 3.34 angstroms apart. The diamond crystal is cubic wherein every carbon atom is bound by covalent bonds to four other carbon atoms at distances of 1.54 angstroms at the corners of a tetrahedron. Amorphous carbon such as carbon black is related to graphite in that there are atoms in flat planes but they are not stacked in registry and result in imperfect crystal lattice structures. This is called "turbostratic." Because the diamond and amorphous carbon crystalline structures do not have this stacked registry in their crystalline lattice, they do not possess the characteristic of good electronic conductivity.

Petroleum coke consists primarily of elementary carbon derived from hydrocarbons by removal of hydrogen and to a lesser extent other elements such as nitrogen and sulfur initially present in the basic charge stock. Amorphous carbon frequently has internal strains, due to resistant heating which particularly in steel manufacture, cause electrode failure through fracturing. The present invention is based on the discovery that by optimization of the time-temperature relationship in delayed coking of hydrocarbons, a method may be developed to produce carbon having a graphitic crystalline structure.

It has been a common practice to transform petroleum hydrocarbons into elementary carbons. This practice is generally conducted in vessels into which the peroleum oil or fluid is charged and carbonized by external heating, or it may be charged hot into the coking drums continuously without additional heating to effect the desired carbonization. The most common charging stock employed for such coking operations is the high boiling residuum from crude oil fractionation. In efforts to improve the quality of the coke obtained from petroleum coking operations, the use of exotic hydrocarbon mixtures obtained through processing of high boiling residuum by thermal and catalytic cracking techniques with or without processing, such as hydrogenation or extraction has been suggested. The exotic stocks are usually very rich in high molecular weight aromatic hydrocarbons and thus are uneconomical, and have proven unsatisfactory for the carbonization product of conventional processing.

In a petroleum carbonizing or coking process, the transformation of hydrocarbons to elementary carbon requires heat to effect a thermal decomposition and adequate time to insure efficiency of the reaction. Only carbon is produced as a product of such petroleum coking operations but the crystalline structure which results has not always been predictable and its properties and characteristics cannot be determined before an actual operation. Therefore, it has been common practice to take the products of such coking operations and to alter the crystalline structure thereof by recrystallization processes normally employing extremely high temperatures at high operating cost and with complicated and expensive apparatus required in such treatments.

Accordingly, one of the objects of this invention is to provide a simple, efficient and economical process for controlling carbon crystallinity to obtain a carbon product having a predetermined index of crystallinity.

Another object of this invention is to provide a novel arrangement of apparatus for transformation of petroleum hydrocarbons into elementary carbon having a high index of graphite crystallinity.

Still another object of this invention is to provide a simple, efficient and economical method for producing elementary carbon having a high index of graphitic crystallinity with a minimum of undesirable turbostratic adulteration.

A further object of this invention is to provide a simple, efficient and economical method for producing high quality elementary statostratic carbon usable for fabrication of electrodes and other electronic uses requiring a carbon of good conductivity.

As this invention relates to crystallinity of carbon compounds and to a great extent variation in the true density of the three forms of carbon (amorphous, graphite, and diamond) the true density relationships are listed for convenience.

| | (True Density) | |
|---|---|---|
| | Specific | Lbs./Cu. Ft. |
| Amorphous Carbon | 1.8–2.1 | 112–131 |
| Graphitic Carbon | 2.25 | 140 |
| Diamond Carbon | 3.51 | 219 |

In conducting experimental tests to determine suitable apparatus and methods for controlling the index of crystallinity of the carbon product from a petroleum coking operation, a method of determining the characteristics of the product was necessary. The true density of coke or carbon can not be determined or obtained by conventional gravimetric techniques due to the variation in porosity characteristics. This is true since it is almost impossible to prepare a pore free sample specimen by known laboratory or experimental techniques. Strict X-ray diffraction techniques providing patterns somewhat indicative of the crystallinity of a produced coke from experimental coker runs were only partially satisfactory in comparative evaluation of test results. Numerous coke samples obtained during many experimental coker runs were treated to both X-ray diffraction tests and porosity measurement tests. Comparison of this data with an apparent density measurement provided a true carbon density by mathematical calculation. Using the foregoing techniques considerable data was evaluated to derive the most efficient process parameters for the production of a highly graphitic coke.

Apparatus which may be used to obtain coke according to the concepts of this invention is schematically indicated in the attached drawing to which reference will now be made. The apparatus comprises an elongated reaction vessel 10 converging at its top from which an off-gas conduit 11 extends so as to be suitably interconnected with a fractionator which is not shown in the drawings. The bottom of the reactor 10 is stepped to define a lower aging zone or chamber 12. A product conduit 13 connects with the bottom of chamber 12 and discharges into a calciner 14 discharging into a cooler 15 and a product discharge conduit 16 conducts calcined coke to an automatic weight and car loader (not shown). A rotatable drum 20 is mounted internally of the reaction vessel 10 and is driven through a shaft 19 under suitable driven regulation to provide controlled rotation of the drum. A feed conduit 21 extends into reactor 10 and has a downwardly directed outlet 22 adapted to continuously discharge a hot feed charge on the upper peripheral surface of drum 20 which is rotating at a controlled r.p.m.

As hot hydrocarbon impinges on the peripheral surface of drum 20, a plurality of layers of carbon are continuously formed. In order to obtain carbon having a high index of graphitic crystallinity it is necessary to remove the coke from the coking drum immediately upon formation of statostratic crystalline lattice structure. This is done by the coke scraper 24 which is mounted about 180° from the discharge outlet 22. The carbon thus removed by scraper 24 falls into a coke aging stage or chamber 12 providing a substantial period of retention of the carbon discharge. From there, the carbon is moved through conduit 13 into calciner 14 for removal of undesirable adultering products. Thereafter, the calcined product passes through cooler 15 and then through the discharge outlet 16 to storage or disposition.

In operating apparatus according to the method of this invention it is noted that coke initially formed in the coking vessel generally possesses a higher true density or graphitic index of crystallinity than the portions which are left in the vessel for longer time periods. In the analysis of this operation, it was determined that initial coke formation was of a graphitic nature and thus of the desired statostratic crystalline lattice form. Although the graphitic coke formed on the top of the drum, it was found that further deposition of carbon caused undesirable turbostratic crystalline growth therein yielding a coke having high content amorphous carbon. This indicated that the initial desired graphite crystalline structure served as a nuclei for further deposition of carbon which carbon formed into an amorphous carbon product.

It was also discovered that the type of carbon produced from petroleum hydrocarbon is greatly affected by the temperature at which the coking is done as well as the time factor above discussed. High temperatures appear to accelerate the production of the undesired turbostratic crystallinity or amorphous carbon product. Lower temperature of coking tends to produce greater quantities of the desired graphitic or statostratic crystal lattice structure, thus indicating that the nuclei phenomenon above mentioned is accelerated by higher temperatures and retarded by lower temperatures.

A high quality graphite carbon production is obtained by a delayed coking operation wherein there is an optimization of time-temperature relationships in the reactor vessel. The test work undertaken to date indicates that the lower the temperature, the longer the coking cycle has to be; however, the longer the coking cycle, the more tendency there is for undesirable amorphous carbon to adulterate the product. The higher the temperature, the shorter the coking cycle, but this also tends to accelerate deposition of amorphous carbon on the initially formed graphite crystal lattice structure.

The conclusion reached from observed tests was that there must be a maintenance of optimum temperature while minimizing the nuclei phenomenon, there must be removal of carbon immediately as it is formed in the coking vessel under the controlled conditions of temperature for minimization of the nuclei phenomenon, and there must be reduction of the time which the hydrocarbon charge is in contact with previously formed carbons.

The following examples indicate experimental optimization of time-temperature relationships in controlling process parameters to obtain a carbon having the desired high degree of graphitic crystallinity:

*Example I*

A residuum obtained from fractionation of crude oil having a specific gravity of 0.9685 @ 60° F. was charged to a coking vessel. The charge had been preheated to 930° F. in a furnace and entered the coking vessel at approximately 900° F. This was a continuous operation carried out over a 24 hour period. At the end of the 24 hour period, the carbon produced was subjected to X-ray diffraction and absorption (porosity) inspections as above discussed and other analytical studies. From this data, the carbon was found to have an average crystalline index equivalent to 27% graphite composition.

*Example II*

A residuum as described in Example I was again charged to a similar coking vessel. The charge had been preheated to approximately 928° F. in a furnace and entered the coking vessel about 898° F. This was also a continuous operation for a twenty-four hour period. The carbon produced was evaluated as in Example I and found to have an average crystalline index equivalent to 50% graphite composition.

*Example III*

As in the examples above described a similar residuum was again charged to a coking vessel. The charge had been preheated to approximately 920° F. in a furnace and entered the coking vessel at about 890° F. Again, a continuous operation for a twenty-four hour period was undertaken. The carbon produced was evaluated as in the above examples and found to have an average crystalline index equivalent to 74% graphite composition.

*Example IV*

A similar residuum as in the previous examples was again charged to a similar coking vessel. The preheating of the charge in a furnace was programmed to a sliding scale temperature control. The charge was heated initially to 930° F. and gradually decreased to 910° F. during the 24 hours of operation. The charge to the coke drum was 900° F. initially and about 870° F. at the end of the 24 hour operational period. The produced carbon was again examined as in the previous examples and found to have an average crystalline index equivalent to 100% graphite composition.

The coking operations discussed in Examples I through IV above were performed at near atmospheric pressures and on a constant time interval. In Example IV it should be noted that although the initial temperature was 930° F., it was reduced according to a sliding scale. Example I utilized the 930° temperature for the entire twenty-four hour period of operation and such a practice is undesirable as a very low index equivalent was obtained. The results of Example II verify this wherein a drop of 2° F. to 928° F., although increasing the index equivalent to 50%, was still not satisfactory. These comparisons established that the 920° F. for preheating (Example III) is the desired and preferred upper limit for preheating of the petroleum hydrocarbon residuum fed to the coking vessel. Further, Example III establishes that the charge should not enter the coking vessel at greater than 890° F. While the 890° F. temperature appeared to be the upper limit for charging, further experiment indicated that 840° F. is the minimum desired temperature for charging the coking vessel.

Thus, in preferred practice the petroleum residuum is heated to a temperature not to exceed 920° F., but which may be as low as 910° F. and is charged to the reactor vessel at a temperature in the range of about 840° to 890° F. Immediately upon formation of carbon having a statostratic crystalline lattice structure (and thus high quality graphitic carbon) it is removed from the coking drum. This is a variable parameter in a given process and is balanced by coordination of the revolution or speed of rotation of the drum, the rate of residuum delivery to the drum, and the temperature at which the charge is delivered.

Once the desired operating parameters for a given coking operation have been determined, it is possible to continuously produce a graphitic carbon of consistent quality over extended time periods. Further tests were undertaken along the lines discussed above with reference to Examples I through IV in which aromatics (such as slurry oil) were included in the coker charge to observe what effects aromatics would have on the process. It was noted that the inclusion of aromatics tended to increase the degree of graphitic crystallinity, but observation also indicated that the aromatics were refractory materials and possessed limited immunity to the nuclei action. Thus, while inclusion of aromatics tended to decrease the disruption of desired statostratic crystalline lattice structure because of its limited immunity to the nuclei phenomenon and undesired turbostratic crystalline lattice, the same results are obtained when time and temperature factors in coking are controlled as discussed with reference to Examples I through IV. Therefore, while the presence of aromatics may assist in increasing the degree of graphitization, by employing the concepts of this invention exotic charges of aromatics are not necessary for production of quality graphitic carbon.

By utilizing the practices described herein, a high and consistent quality of graphite carbon is continuously produced in a single treatment zone and the product therefrom does not require recrystallization treatment. The essence of the novel method is careful control of the time-temperature relationship under which the desired graphitic crystallinity is obtained. The essence of the apparatus arrangement is to provide means for the immediate removal of carbon as it is crystallized on a rotating drum to eliminate the nuclei phenomenon and disruption of statostratic crystallinity which would result if the operation permitted extended growth of other carbon atoms.

Having thus described the invention in sufficient detail to enable those skilled in the art to practice it, what is desired to be protected by Letters Patent is set forth in the following claims.

What is claimed is:

1. A continuous process for producing coke having a high index of graphitic crystallinity, which comprises treating a residuum obtained from fractionation of crude oil without aromatic addition by preheating in a furnace to a maximum temperature of about 920° F., continuously introducing the preheated liquid at a reduced temperature of about 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, and discharging the formed carbon coke from the coking surface into a storage area in the coking vessel maintained out of contact with said entering stream.

2. A continuous process for producing coke having a high index of graphitic crystallinity, which comprises treating a residuum obtained from fractionation of crude oil without aromatic addition by preheating in a furnace to a maximum temperature not exceeding 930° F., continuously introducing the preheated liquid at a reduced temperature of about 840° to 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, and discharging the formed carbon coke from the coking surface into a storage area in the coking vessel maintained out of contact with said entering stream.

3. A continuous process for producing coke having a high index of graphitic crystallinity, which comprises treating a residuum obtained from fractionation of crude oil without aromatic addition by preheating in a furnace to a maximum temperature not exceeding 930° F., continuously introducing the preheated liquid at a reduced temperature of about 840° to 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, discharging the formed carbon coke from the coking surface into a storage area in the coking vessel maintained out of contact with said entering stream, and continuously moving the carbon coke so discharged in a retarded progressive flow out of the coking zone.

4. A continuous process for producing coke having a high index of graphitic crystallinity, which comprises treating a residuum obtained from fractionation of crude oil without aromatic addition by preheating in a furnace to a maximum temperature not exceeding 930° F., continuously introducing the preheated liquid at a reduced temperature of about 840° to 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, discharging the formed carbon coke from the coking surface into a storage area in the coking vessel maintained out of contact with said entering stream, continuously moving the carbon coke so discharged in a retarded progressive flow out of the coking zone, and aging the discharged coke under reducing temperature for a predetermined time interval after discharge from the coking zone.

5. A continuous process for producing coke having a high index of graphitic crystallinity, which comprises treating a residuum obtained from fractionation of crude oil without aromatic addition by preheating in a furnace to a maximum temperature not exceeding 930° F., continuously introducing the preheated liquid at a reduced temperature between 840° and 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, discharging the formed carbon coke from the coking surface into a storage area in the coking vessel maintained out of contact with the entering liquid stream, and retaining the formed coke in the storage area for a total treatment time of not more than twenty-four hours.

6. A continuous process for producing coke having a high index of graphitic crystallinity, which comprises treating a residuum obtained from fractionation of crude oil without aromatic addition by preheating in a furnace to a maximum temperature capable of producing a feed charge temperature not exceeding 890° F., continuously introducing the preheated liquid in a reduced temperature between 840° and 890° F. in a thin stream onto the top of a rotating coking surface in a coking vessel, moving carbon coke in a thin layer out of contact with said stream immediately after it is formed by continuing rotation of said surface so as to prevent deposit of additional liquid thereon, discharging the formed carbon coke from the coking surface into a storage area in the coking vessel maintained out of contact with the entering liquid stream, and retaining the formed coke in the storage area at temperatures less than 840° F. for a total treatment time of not more than twenty-four hours.

7. A continuous process for producing coke having a high index of graphitic crystallinity, which comprises treating a residuum obtained from fractionation of crude oil without aromaitc addition by preheating in a furnace to a maximum temperature capable of producing a feed temperature not exceeding 890° F., continuously introducing the preheated liquid at a reduced temperature between 840° and 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, discharging the formed carbon coke from the coking surface into a storage area in the coking vessel maintained at a temperature of approximately 840° F. and out of contact with the entering liquid stream, and retaining the formed coke in the storage area for a total treatment time of up to about twenty-four hours.

8. A continuous process for producing coke having a high index of graphitic crystallinity, which comprises treating a residuum obtained from fractionation of crude oil without aromatic addition by preheating in a furnace to a maximum temperature not exceeding 930° F., continuously introducing the preheated liquid at a reduced temperature between 840° and 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, discharging the formed carbon coke from the coking surface into a storage area in the coking vessel separated from the entering liquid stream and maintained at a temperature of about 840° F. and retaining the formed coke in a progressive flow through said storage area for a total treatment time of not more than twenty-four hours.

9. A continuous process for producing coke having a high index of graphitic crystallinity, which comprises treating a residuum obtained from fractionation of crude oil without aromatic addition having a specific gravity of about 0.9685 at 60° F. by preheating in a furnace to a maximum temperature not exceeding 930° F., continuously introducing the preheated liquid at a reduced temperature between 840° and 890° F. in a thin stream onto the top of a moving coking surface in a coking vessel maintained at near atmospheric pressure, moving carbon coke in a thin layer out of contact with said stream immediately after it is formed on said surface so as to prevent deposit of additional liquid thereon, discharging the formed carbon coke from the coking surface into a storage area in the coking vessel separated from the entering liquid stream and maintained at a temperature of about 840° F., retaining the formed coke in a progressive flow through the storage area for a total treatment time of not more than twenty-four hours, and aging coke passing from the storage area under a reducing temperature for a predetermined time interval.

References Cited by the Examiner
UNITED STATES PATENTS 2,697,069 12/1954 Bradley _____ 202—136
2,922,755 1/1960 Hackley _____ 208—39

DELBERT E. GANTZ, *Primary Examiner.*

A. RIMENS, *Assistant Examiner.*